United States Patent [19]
Walter et al.

[11] Patent Number: 6,151,677
[45] Date of Patent: Nov. 21, 2000

[54] PROGRAMMABLE TELECOMMUNICATIONS SECURITY MODULE FOR KEY ENCRYPTION ADAPTABLE FOR TOKENLESS USE

[75] Inventors: Paul Alan Walter, Westmont; Ellwood Patrick McGrogan, Jr., Cherry Hill; Mike Kleidermacher, Marlton, all of N.J.

[73] Assignee: L-3 Communications Corporation, New York, N.Y.

[21] Appl. No.: 09/167,189

[22] Filed: Oct. 6, 1998

[51] Int. Cl.[7] .............................. H04L 9/00; H04K 1/00; H04M 1/66; H04M 1/68; H04M 3/16
[52] U.S. Cl. .......................... 713/183; 380/270; 455/411
[58] Field of Search .................................. 455/410, 411; 380/270, 273, 274, 277, 247, 275, 276; 713/183, 201, 202, 171, 159, 172, 185, 189, 191

[56] References Cited

U.S. PATENT DOCUMENTS

| | | | |
|---|---|---|---|
| 4,405,829 | 9/1983 | Rivest et al. | 178/22.1 |
| 4,795,898 | 1/1989 | Bernstein et al. | 235/487 |
| 4,816,653 | 3/1989 | Anderl et al. | 235/380 |
| 4,882,474 | 11/1989 | Anderl et al. | 235/380 |
| 4,961,142 | 10/1990 | Elliott et al. | 364/408 |
| 4,965,881 | 10/1990 | Dilley | 380/268 |
| 5,015,834 | 5/1991 | Suzuki et al. | 235/493 |
| 5,077,791 | 12/1991 | Salihi | 380/270 |
| 5,120,939 | 6/1992 | Claus et al. | 235/382 |
| 5,159,634 | 10/1992 | Reeds, III | 380/42 |
| 5,406,619 | 4/1995 | Akhteruzzaman et al. | 379/95 |
| 5,410,599 | 4/1995 | Crowley et al. | 380/9 |
| 5,432,939 | 7/1995 | Blackledge, Jr. et al. | 395/700 |
| 5,444,764 | 8/1995 | Galecki | 455/411 |
| 5,475,756 | 12/1995 | Merritt | 380/24 |
| 5,497,411 | 3/1996 | Pellerin | 379/59 |
| 5,508,691 | 4/1996 | Castleman et al. | 340/825.31 |
| 5,513,261 | 4/1996 | Maher | 380/23 |
| 5,524,134 | 6/1996 | Gustafson et al. | 379/58 |
| 5,569,903 | 10/1996 | Matsubara | 235/492 |
| 5,584,043 | 12/1996 | Burkart | 395/882 |
| 5,602,918 | 2/1997 | Chen et al. | 380/21 |
| 5,619,683 | 4/1997 | Kreft | 395/500 |
| 5,623,637 | 4/1997 | Jones et al. | 395/491 |
| 5,633,920 | 5/1997 | Kikinis et al. | 379/130 |
| 5,664,017 | 9/1997 | Gressel et al. | 380/30 |
| 5,673,317 | 9/1997 | Cooper | 380/23 |
| 5,682,027 | 10/1997 | Bertina et al. | 235/380 |
| 5,682,475 | 10/1997 | Johnson et al. | 395/188.01 |
| 5,698,837 | 12/1997 | Furuta | 235/492 |
| 5,717,927 | 2/1998 | Bergler et al. | 395/676 |
| 5,787,180 | 7/1998 | Hall et al. | 380/52 |
| 5,887,250 | 3/1999 | Shah | 455/411 |

OTHER PUBLICATIONS

Cooke, J.C. and R. L. Brewster. "Cryptographic Security Techniques for Digital Mobile Telephones." Second International Conference on Private Switching Systems and Networks. 1992. pp. 123–130.

Donn, Ivan. "Smart Cards in GSM." Elektron. Feb. 1994. pp. 21–22.

Uimonen, Terho. "Ecrypted Device Secures Wireless Calls (Product Announcement)." Info World. Nov. 15, 1999.

*Primary Examiner*—Gail O. Hayes
*Assistant Examiner*—Anthony DiLorenzo
*Attorney, Agent, or Firm*—Woodcock Washburn Kurtz Mackiewicz & Norris LLP

[57] ABSTRACT

A security module that is preferably tokenless and is used in telephone communications (e.g., cellular) to secure a transmitted bit stream. The module provides traffic encryption, key exchange, key protection, and algorithm protection. The module provides encryption and key processing using a programmable information security architecture (PISA). Preferably, the module does not use a physical device, such as a key or a card, to unlock the security features, and preferably, the security features all reside within the security module and not on a physical device, such as a key or a card. Instead, a personal identification number (PIN) is used to unlock the security features.

23 Claims, 4 Drawing Sheets

PROGRAMMABLE TELECOMMUNICATIONS SECURITY MODULE FOR KEY ENCRYPTION ADAPTABLE FOR TOKENLESS USE

FIELD OF THE INVENTION

The present invention relates in general to securing transmitted data in telecommunications. More particularly, the present invention relates to an electronic module that provides encryption and key processing using a programmable information security architecture and is adaptable for tokenless use.

BACKGROUND OF THE INVENTION

The invention has application in the use of self-contained portable intelligent devices which include a microprocessor for performing data processing. Such devices are presently being embodied in the form of integrated circuit cards (also known as smartcards). These smartcards are considered to be tokens and in their basic form have the appearance of a standard credit card but incorporate within them various forms of integrated circuits to allow for on-board storage and processing of data via an input-output port. Smartcards store information that may be used to identify a particular user. Such cards are intended to be inserted into host devices such as personal computers, communication devices and the like which, in concert with such cards, may provide services only to certain users as identified by the aforesaid user information stored in such cards.

A user might have a card into which is coded a representation of his identity, his signature, passwords or keys that identify him or are reserved for his use, etc. The user might insert his card into a host device such as a computer or communications terminal. The host device might then access such information from the card, and might then grant him access to data intended only for him, allow him to enter messages that recipients will believe to be only from him, enter a digital signature that will be interpreted as his, etc.

Smartcard technology has been used to establish a secure communications link over an unsecured network. U.S. Pat. No. 5,602,918, "APPLICATION LEVEL SECURITY SYSTEM AND METHOD", issued to Chen et al., involves the use of smartcard technology to send authenticatable documents over the internet. The '918 patent provides for mutual authentication of the parties to the communication upon the initial establishment of a communications channel, and the generation of a session key in order to secure the channel. The smartcard is used for all encryption functions and contains data and circuitry for encryption within the smartcard itself. Thus, conventionally, a smartcard (and its accompanying encryption circuitry) resides outside, and separate from, a telecommunications security module.

However, smartcards, being small, are easily lost, stolen, or left unguarded, thereby permitting temporary unauthorized use or duplication. If an unauthorized party inserts the card or a copy of the card into a host device, the host device will read the security parameters from the card just as if the authorized holder of the card had inserted it. Such unauthorized party will thus gain access to services and privileges intended only for the authorized holder of the card; system security may thus be severely compromised. Thus, an important consideration with respect to the use of portable self-contained smartcards for performing transactions between a service user and a service provider is the ability to secure data storage within these devices as well as the ability to secure the transmission of this data to and from these devices.

Another disadvantage of smartcards is that they increase the physical size and cost of the device in which they are to be inserted, because the card reader electronics and the physical slot in which the user inserts the card must be included within the device.

Other means for securing data, especially with respect to data transmission, rely upon the use of secret cipher keys to encrypt the data. These keys have to be stored securely and used securely, otherwise the data transmission is not secure. In other words, encryption methods typically rely on secret keys known only to authorized users of the protected data. In the widely used Data Encryption Standard (DES) developed and promulgated by the National Bureau of Standards, data is enciphered in 64-bit blocks using a single 56-bit key, as described in National Bureau of Standards° Federal Information Processing Standards Publication 46, "Data Encryption Standard," National Bureau of Standards (1977). Encryption techniques using two keys, one for encrypting the data and a different key for decryption, are called "public key" systems because the encryption key can be made public so that anyone can use the public key to encrypt sensitive data, but only a recipient with the secret key can decrypt it. One widely used and highly effective public key algorithm known as the "RSA" system, named after the inventors Rivest, Shamir and Adelman, is described in U.S. Pat. No. 4,405,829, issued to Rivest et al.

When a sensitive transmission is transmitted over an unsecured network, not only must the sender ensure that the transmission cannot be accessed by unauthorized parties, but the recipient is often faced with the challenge of verifying that a received transmission has not been tampered with, and that the purported sender is the actual originator of the transmission.

Current digital signature generating and file encryption methods, including DES and private/public key cryptosystems, provide adequate protection if both parties have the capability of generating the necessary keys. However, because the protection provided by a key is generally a function of the relative computing power between the key generator and those attempting to defeat the key, and because key generation technology often cannot be exported, key generation is best left to agencies known as "key servers," having the capability both of generating and protecting the keys thus generated.

A weakness of any system which relies on key servers lies in the initial establishment of communications between the parties to the communication and the key server. The same problems noted above, involving authentication of the parties to a communication, are also present in communications between the respective parties to a communication and the agency which provides encryption services to those parties, even though the key server might possess its own secured network. Also, once the parties to the communication are authenticated, there remains the problem of key distribution. Distribution of keys over the public network is obviously the most convenient method of key distribution, but such electronic transfer is generally less secure than distribution of keys by means other than electronic transfer or by means of a completely secured network line.

The security of both single-key and public-key encryption systems depends on the user's ability to keep the key or keys secret. Although both the DES and RSA encryption algorithms themselves can be depended upon to provide adequate security, neither system can safeguard data if the keys can be learned. The management of the keys themselves accordingly presents a difficult component of good data security system.

Although the art of encryption within transmission networks is well developed, there remain some problems inherent in this technology, particularly with respect to the use of tokens and keys. Therefore, a need exists for a security module that is tokenless and that overcomes the drawbacks of the prior art.

SUMMARY OF THE INVENTION

The present invention is directed to a telephone security module comprising: identification code input means for receiving an identification code; data input means for receiving data to be encrypted; a first processor coupled to the identification code input means for validating the identification code; a second processor coupled to the first processor containing secured key management data, the key management data comprising key exchange software and traffic encryption software; a third processor coupled to the data input means and the second processor for processing data received at the data input means into digital data, for processing decrypted received data, and for performing key exchange encryption; an encryption engine coupled to the second processor and the third processor for encrypting the digital data to provide output data for transmission and for decrypting received encrypted data; and output means, connected to the encryption engine, for receiving the received encrypted data from and transmitting the output data to a telephony network.

According to one aspect of the present invention, the data input means comprises at least one of a data port and a microphone for receiving text data and voice data, respectively. Preferably, a codec is coupled between the data input means and the third processor for converting voice data from analog to digital.

In accordance with further aspects of the present invention, the identification code input means comprises a keypad or a memorycard, and the identification code is a personal identification number (PIN).

In accordance with further aspects of the present invention, the third processor comprises a memory, preferably a static RAM, for storing key exchange software received from the second processor responsive to the valid identification code, and the encryption engine comprises a memory, preferably a static RAM, containing traffic encryption software received from the second processor responsive to the valid identification code.

In accordance with a further aspect of the present invention, the encryption engine comprises a software implemented data encryption and decryption algorithm.

In accordance with a further aspect of the present invention, the encryption engine comprises a firmware implemented data encryption and decryption algorithm.

According to further aspects of the invention, the second processor is a smartcard integrated circuit (IC), and the third processor is a digital signal processor (DSP). Preferably, the third processor further comprises a vocoder, and the encryption engine is a field programmable gate array (FPGA). In accordance with other aspects, the encryption engine further comprises a multiplexer (mux) bypass for unsecured transmission, and the second processor comprises a memory containing the secured key management data.

Another embodiment within the scope of this invention includes a method of providing secure communications, comprising the steps of: receiving an identification code from an input means; validating the identification code; receiving data to be encrypted from at least one of a data port and a microphone; providing key exchange software to a second processor from a first processor; performing key exchange at the second processor to establish a secure communications link; providing traffic encryption software to an encryption engine from the first processor; processing received data into digital data at the second processor; encrypting the digital data at the encryption engine to provide output data for transmission; and transmitting the output data to a telephony network.

According to another aspect of the present invention, the method further comprises the steps of clearing the key exchange software from the second processor and clearing the traffic encryption software from the encryption engine after the output data has been transmitted to the telephony network.

According to another aspect of the present invention, the method further comprises the step of converting voice data received at the microphone from analog to digital.

The foregoing and other aspects of the present invention will become apparent from the following detailed description of the invention when considered in conjunction with the accompanying drawings.

DESCRIPTION OF EXEMPLARY EMBODIMENTS AND BEST MODE

The present invention is directed to a security module that is preferably tokenless and is used in telephone communications (e.g., cellular) to secure a transmitted bit stream. The module provides traffic encryption, key exchange, key protection, and algorithm protection. The module provides encryption and key processing using a programmable information security architecture (PISA). Preferably, the module does not use a physical device, such as a key or a card, to unlock the security features, and preferably, the security features all reside within the security module and not on a physical device, such as a key or a card. Instead, a personal identification number (PIN) is used to unlock the security features.

Figure 1:
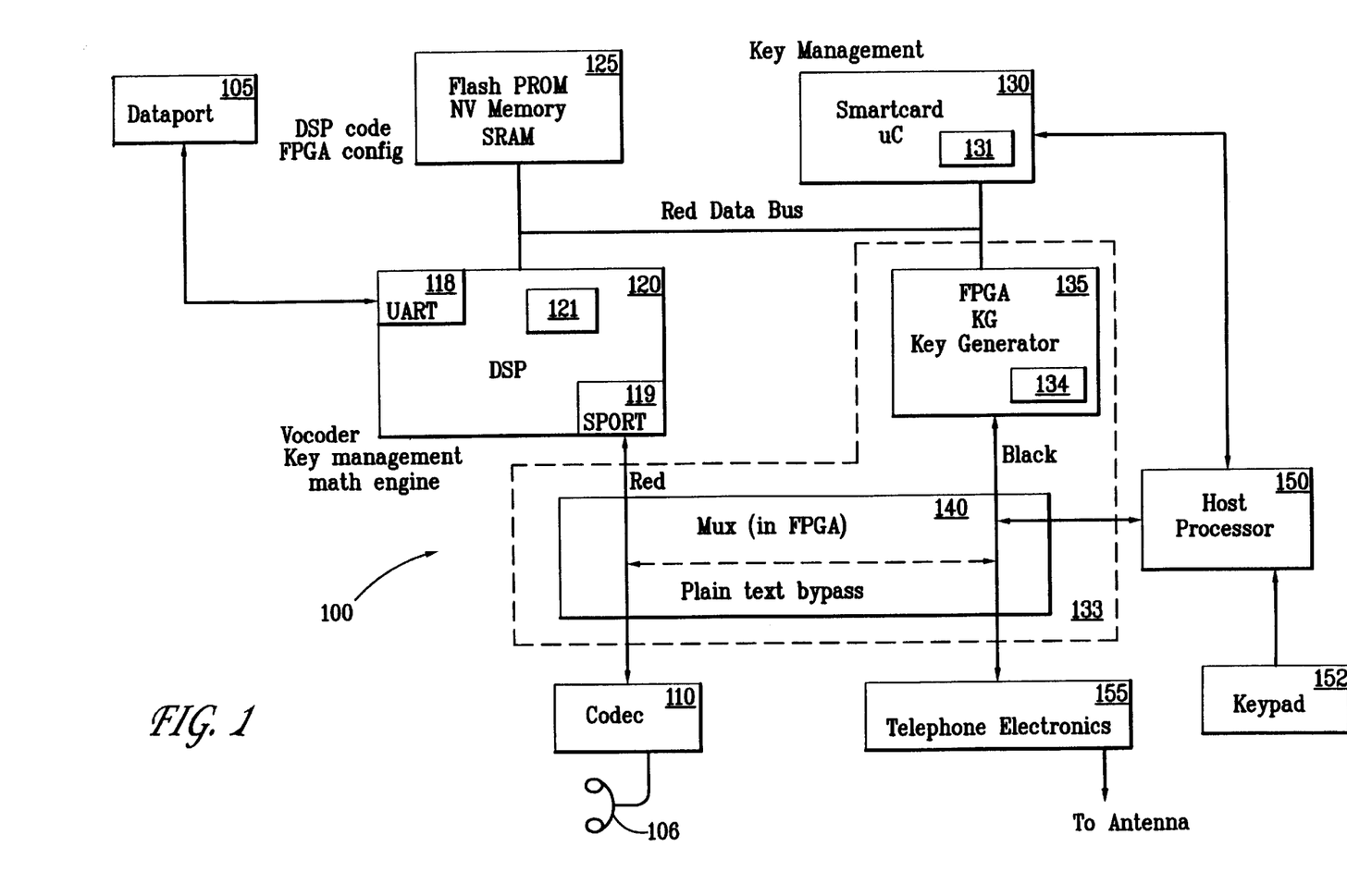
FIG. 1 is a block diagram of an exemplary telecommunications security module in accordance with the present invention.

An exemplary module 100 in accordance with the present invention is shown in FIG. 1. The module 100 includes a field programmable gate array (FPGA) 133, preferably static RAM based, which performs traffic encryption, a digital signal processor (DSP) 120 which performs key management arithmetic algorithms (i.e., the arithmetic for the key exchange) and voice coder (vocoder) functions, and an integrated circuit (IC) chip 130 designed for conditional access systems which preferably provides inherent tamper protection. In this manner, the module prevents information (key data) from being available when the telephone is off or unsecured. Key data information is available and exposed only during data download and during a secure call. It should be noted that any or all of these can be integrated into a single integration circuit.

Input means, such as a dataport 105 and/or a microphone 106 is provided for receiving data, such as text from a personal computer and/or speech or voice data, respectively. The input means are coupled to the DSP 120 via an appropriate port, such as a universal asynchronous receiver transmitter (UART) 118 or serial port (SPORT) 119. Speech or voice data is converted from analog to digital at a codec 110 prior to transmission to the DSP 120. The codec 110 also is coupled directly to the FPGA 133 for unsecured data transmission mode (i.e., "plain text mode") operation. In this mode, data is passed, via a multiplexer (mux) 140 in the FPGA 133, from the codec 110 to the telephone electronics 155 for transmission without being encrypted or secured.

The DSP 120 is coupled to a memory 125, such as a flash PROM, a nonvolatile memory, or a static RAM. The memory 125 stores the code and routines used by the DSP 120 and the FPGA 133. The DSP 120 and the memory 125 are coupled via a data bus to the IC 130 and the FPGA 133. The IC 130 comprises a memory 131 for storing secure information used in the key exchange. It is this secure information that is unlocked by the PIN, as described below, and passed to memories 121 and 134, residing in the DSP 120 and the FPGA 133, respectively. The IC 130 and the FPGA 133 are coupled to a host processor 150 which performs the low level protocol, input/output, and handshaking functions. A preferred processor 150 is the 68340 manufactured by Motorola. The IC 130 and the host processor 150 are coupled via a data bus.

A keypad 152 is coupled to the host processor 150 for user entry of a PIN. The PIN is preferably a multi-digit random number, such as 10 digits, which is not user-selectable or user-changeable. A display (not shown) can optionally be used in conjunction with the keypad 152 to display security information. The keypad 152 preferably includes a switch or other means, such as a pushbutton, for allowing the user to activate the security module, thereby activating a secure transmission mode.

The telephone electronics 155 is coupled to the, FPGA 133 for transmitting either secured or unsecured data to another telephone or system via an antenna. The telephone electronics 155 is essentially a telephone and is preferably a conventional cell phone having telephone electronics and is connected to a transmission antenna.

A conventional voltage regulator (not shown) provides the appropriate operating voltage to the security module 100 (e.g., about 3.3 volts) from the power supply (e.g., a battery) of the phone.

The data lines labeled "black" carry secured data (e.g., secure data transmitted over unsecured medium), and the data lines labeled "red" carry unsecured, classified data (e.g. key, traffic data (internal), keystream).

The DSP 120 provides the math acceleration for smartcard IC based key management (electronic key exchange) functions. Preferably, the DSP 120 operates in two distinct modes: security association establishment and traffic processing. All key management processes and objects are purged after the security establishment. Preferably, the DSP 120 has enough throughput to do traffic cryptography, and switches between a user application (vocoder) and a cryptographic task (encryption/decryption) within a predetermined time cycle, preferably about 20 ms. The DSP 120 manages the user data interface in the data modes. A preferred DSP is the TMS320C50 manufactured by Texas Instruments. Preferably, the DSP 120 has a memory 121, such as a static RAM, which stores key exchange software provided by the IC 130. The memory 121 is cleared after a secure telephone exchange is terminated, and when the telephone (and hence, the security module) is powered down.

The FPGA 133 is used for traffic algorithm execution and encryption. The FPGA 133 is configured to provide separate secured and unsecured ports to enhance assurance (i.e., security). The FPGA 133 facilitates the use of common hardware for different security scenarios, and the addition of future algorithms. The FPGA 133 provides the logic to interface the security processor 130, the DSP 120, and the host processor 150 without additional parts. Preferably, the FPGA 133 has a memory 134, such as a static RAM, which stores traffic encryption software provided by the IC 130. The memory 134 is cleared after a secure telephone exchange is terminated, and when the telephone (and hence, the security module) is powered down. Thus, the static RAM configuration data is cleared when the system is not in use. A preferred FPGA 133 for use in the present invention is one of the Xilinx 4000 family.

The security processor (smartcard IC) 130 provides a tamper-protected environment at the chip level for security critical functions. A nondeterministic randomizer is used to support key exchange protocols. Library macros are provided to do the hashing functions for PIN-based access control. Preferably, the IC 130 has built-in conventional security features to deter extraction or modification of sensitive internal protected data. The IC 130 provides non-volatile storage (e.g., EEPROM as memory 131) inside its protected environment. A preferred IC is one that is used in smartcards and is known as cryptographic smartcard IC, including, for example, the MSC0409 manufactured by Motorola and the ST16CF54 manufactured by SGS-Thomson. These ICs have non-deterministic randomizers for supporting key exchange protocols, have library macros for PIN-based access control, have built-in security features to deter extraction or modification of sensitive internal protected data, and provide non-volatile storage (e.g., EEPROM) inside their protected environment. The IC 130 also has a decryption algorithm for decrypting key generator data from the memory 131. It should be noted that the smartcard IC is not packaged in a separate smartcard, as is conventional, but is incorporated within the security module of the present invention.

A multiplexer 140 is provided in an FPGA key generator 135. A plain text bypass is provided which transfers data in an unclassified mode. In other words, the plain text bypass is used for unsecured data transfer (i.e., unsecured communication). Moreover, the memories 121 and 134 are erased on power down or on command. This prevents information (key data) from being available when the phone is off or in an unsecured mode. The information is available and exposed only during download and during a secure call.

Thus, according to the preferred embodiment of the invention, the electronic security module provides encryption and key processing using a programmable information security architecture and a smartcard IC within the security module itself. The module is tokenless; i.e., it does not use a physical device, such as a key or a card, to unlock the security features; instead, a personal identification number (PIN) is used to unlock the security features.

Figure 2:
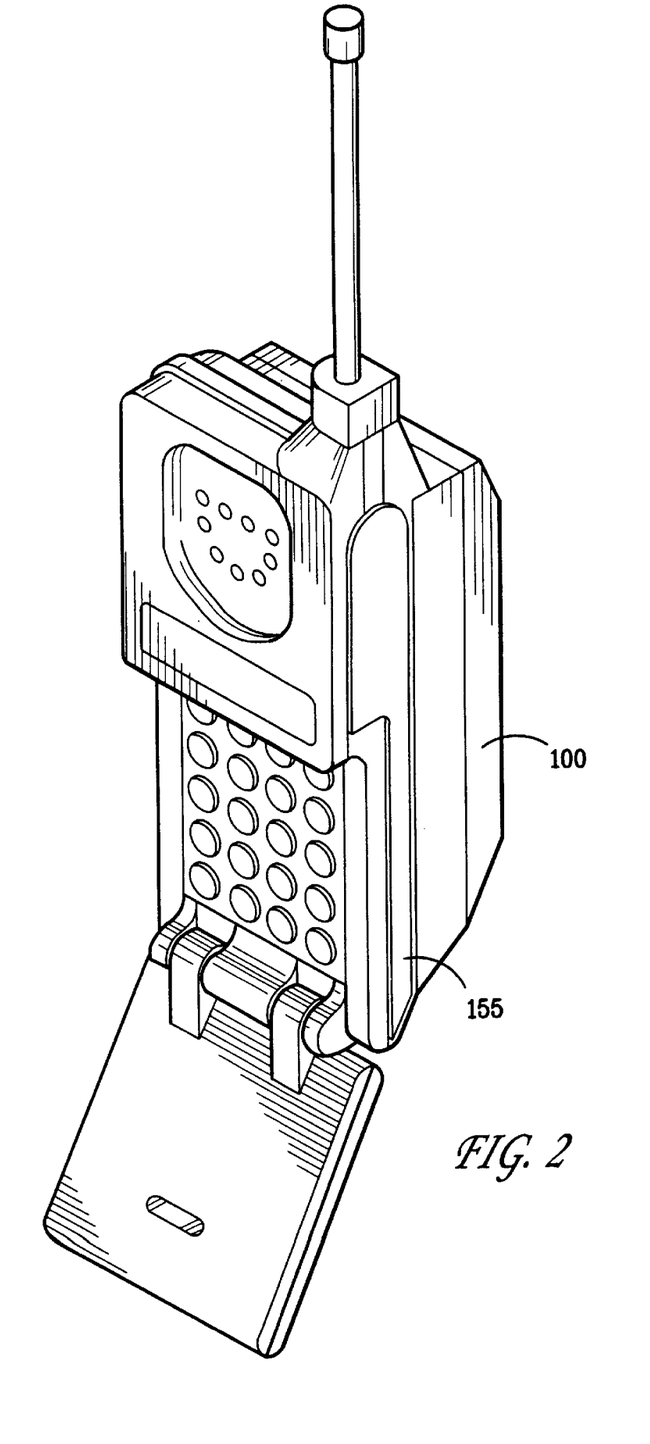
FIG. 2 is an isometric view of an exemplary telecommunications security module and telephone in accordance with the present invention.

Preferably, the module 100 of the present invention is incorporated into a handset of a telephone 155, as shown in FIG. 2. The present invention can be incorporated into a conventional digital cell phone, as shown in FIG. 2, in which the voice has already been digitized and compressed by a vocoder, such as those manufactured by Qualcomm.

Figure 3:
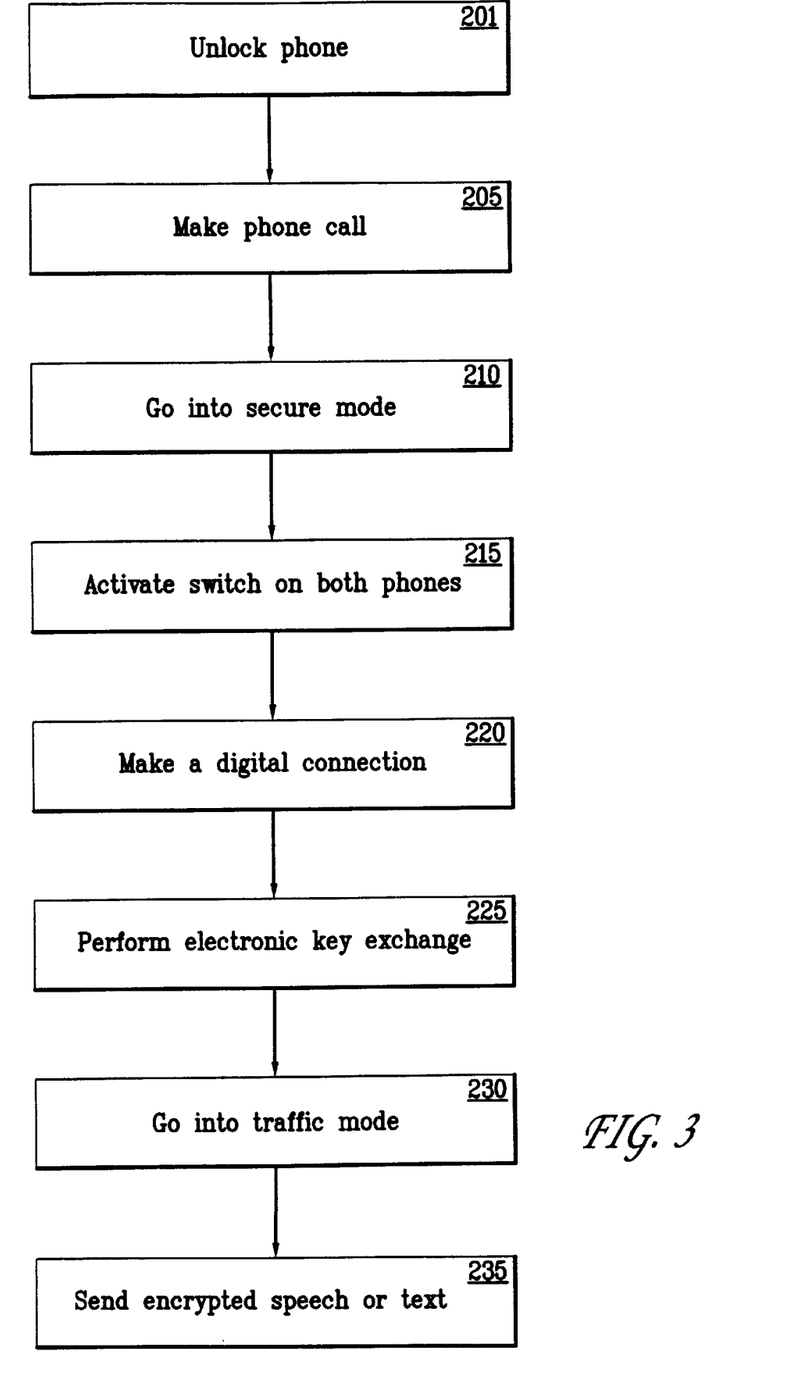
FIG. 3 is a flow diagram of an exemplary method of operation of a telecommunications security module in accordance with the present invention.

FIG. 3 is a flow diagram of an exemplary method of operation of a telecommunications security module in accordance with the present invention. When power is applied to the security module, or when it is reset, the security module is initialized and internal self checks are made, such as checkword testing of the traffic algorithm hardware. At step 201, the user unlocks the phone, preferably by entering a valid PIN into keypad 152. This enables the phone to provide secure phone calls. In the preferred embodiment, the host processor 150 transmits the PIN to the IC 130. The IC 130 verifies that the PIN is valid.

At step 205, a user makes a phone call. It is important to note that until such time as a user desires secure communications, the security module is essentially bypassed, that is, analog or digital signals go directly to the transmitting network, such as a public switched telephone network (PSTN) or cellular network, without being processed by the security module. The two parties that are communicating agree to go into a secure mode at step 210 and activate a switch or modem on both phones at step 215. It should be noted that in digital cellular communications, the system is digital from the handset through to the base station. At the digital cellular base station, a modem is connected to the public switched network to allow the user to communicate with the other party (the secure telephone at the other end). The security module of the present invention can also be used in analog cellular applications, in which case a modem would reside in the telephone electronics.

Once a user decides to engage the secure communications, the security and encryption is invoked, and keys for encryption are loaded into the encryption engine (i.e., the FPGA 133). A digital connection is made at step 220 and the electronic key exchange is performed at step 225 between the communicating devices. The key exchange involves the DSP 120 and the IC 130. The IC 130 programs the memory 121 of the DSP 120 with key exchange software. The IC 130 also loads the memory 134 of the FPGA 133 with the appropriate traffic encryption software. The key data preferably is then exchanged by the DSP 120 using public key cryptography. The smartcard IC 130 is used to provide a true random number for the key data exchange. Thus, some secure information used in the key exchange is stored in the IC 130. As described above, the PIN unlocks this information for use in the key exchange. The DSP 120 loads the traffic key into the FPGA 133 at step 230, and both sides synchronize. After the key exchange takes place, the phones enter traffic mode. Thereafter, the data or vocoders are engaged, and at step 235, transmissions are encrypted and decrypted at the destination according to the key, thereby the exchange of text or data occurs.

Although the above description describes the user as unlocking the phone (step 201) before making the call (step 205), it should be noted that the user can unlock the phone after making the call, and anytime before going into secure mode (step 210). Thus, the phone can be used in a non-secure mode, and during the non-secure call, the phone can be switched into a secure mode by unlocking the phone, and then performing steps 210 et seq.

Figure 4:
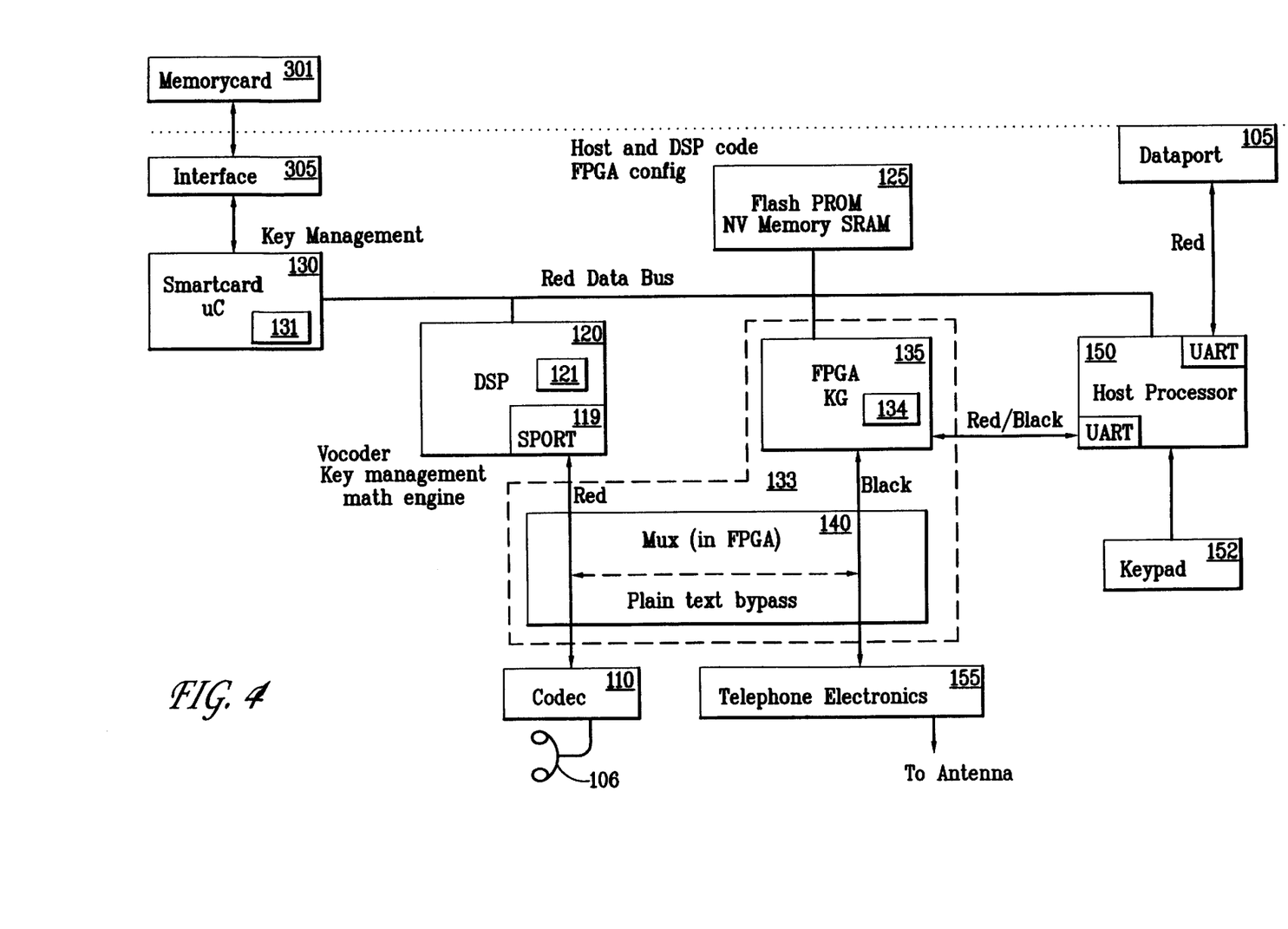
FIG. 4 is a block diagram of another exemplary telecommunications security module in accordance with the present invention.

FIG. 4 shows a second embodiment of the present invention, in which a memorycard 301, storing authorization information, for example, is used to access and enable the encryption in addition to a PIN entered through a keypad as in the above described embodiment. This provides an additional layer of security. FIG. 4 contains similar elements to those described above with respect to FIG. 1. These elements are labeled identically and their description is omitted for brevity.

In the embodiment of FIG. 4, it should be noted that the smartcard IC 130 is embodied within the device, as in the embodiment of FIG. 1, and not in the memorycard 301. The memorycard 301 serves a similar function as the keypad 152 in the embodiment of FIG. 1 and does not store any encryption data itself. The memorycard is inserted into a card reader within the security module, and via an interface 305, the smartcard IC 130 within the security module determines if the memorycard is valid (e.g., has provided proper authorization information), and if so, a PIN is entered into the keypad 152. The IC 130 determines if the PIN is valid. If both the memorycard is valid and the PIN is valid, processing continues as described in the above embodiment. It should be noted that in this embodiment, the dataport 105 is preferably coupled directly to the host processor 150 (via a UART and a red data bus) which is in turn connected to the smartcard IC 130 and the FPGA 133.

Regarding tamper protection, the tamper boundary of the present invention is flexible. It can be contained within the tamper protected smartcard IC 130. During times of establishing communications with another party, the module can extend the classified boundaries to include the DSP 120 to aid as a math engine. After this call establishment, the memory 121 of the DSP 120 is cleared to render the DSP 120 unclassified. The DSP 120 may then be used for other functions, such as a vocoder in secure telephone applications.

The traffic encryption algorithm of the FPGA 133 is not loaded into the FPGA 133 until a secure communication session is established. At other times, this device's internal circuitry is programmed as an unclassified circuit.

Thus, the present invention provides traffic encryption, key exchange, key protection, and algorithm protection without the use of a pluggable physical token or keycard and combines commercially available and unclassified hardware integrated circuits and software to create a low cost encryption module in an unclassified production environment. The encryption module can secure classified data up to "top secret" (NSA Type 1) data.

Although illustrated and described herein with reference to certain specific embodiments, the present invention is nevertheless not intended to be limited to the details shown. Rather, various modifications may be made in the details within the scope and range of equivalents of the claims and without departing from the invention.

What is claimed:

1. A telephone security module comprising:
   identification code input means for receiving an identification code;
   data input means for receiving data to be encrypted;
   a first processor containing secured key management data, said key management data comprising key exchange software and traffic encryption software,
   said first processor for validating said identification code, for providing said key exchange software to a second processor, and for providing said traffic encryption software to an encryption engine,
   said second processor for performing key exchange to establish a secure communications link, and for processing said received data into digital data,
   said encryption engine for encrypting said digital data to provide output data for transmission; and
   output means for transmitting said output data to a telephony network.

2. The telephone security module according to claim 1, wherein said identification code input means comprises a keypad.

3. The telephone security module according to claim 1, wherein said identification code is a personal identification number (PIN).

4. The telephone security module according to claim 1, wherein said identification code input means comprises a memory card.

5. The telephone security module according to claim 1, wherein said data input means comprises at least one of a data port and a microphone for receiving text data and voice data, respectively.

6. The telephone security module according to claim 1, further comprising a codec coupled between said data input means and said second processor for converting voice data from analog to digital.

7. The telephone security module according to claim 1, wherein said first processor is a smartcard integrated circuit (IC).

8. The telephone security module according to claim 1, wherein said second processor is a digital signal processor (DSP).

9. The telephone security module according to claim 8, wherein said second processor further comprises a vocoder.

10. The telephone security module according to claim 1, wherein said encryption engine is a field programmable gate array (FPGA).

11. The telephone security module according to claim 10, wherein said encryption engine further comprises a multiplexer bypass for unsecured transmission.

12. The telephone security module according to claim 1, wherein said first processor comprises a memory containing said secured key management data.

13. The telephone security module according to claim 1, wherein said second processor comprises a memory for storing key exchange software received from said first processor responsive to said valid identification code.

14. The telephone security module according to claim 13, wherein said memory comprises a static RAM.

15. The telephone security module according to claim 1, wherein said encryption engine comprises a memory containing traffic encryption software received from said first processor responsive to said valid identification code.

16. The telephone security module according to claim 15, wherein said memory comprises a static RAM.

17. The telephone security module according to claim 1, wherein said encryption engine comprises a software implemented data encryption and decryption algorithm.

18. The telephone security module according to claim 1, wherein said encryption engine comprises a firmware implemented data encryption and decryption algorithm.

19. A method of providing secure communications, comprising the steps of:

receiving an identification code from an input means;

validating said identification code;

receiving data to be encrypted from at least one of a data port and a microphone;

providing key exchange software to a second processor from a first processor;

performing key exchange at said second processor to establish a secure communications link;

providing traffic encryption software to an encryption engine from said first processor;

processing received data into digital data at said second processor;

encrypting said digital data at said encryption engine to provide output data for transmission; and transmitting said output data to a telephony network.

20. The method according to claim 19, further comprising the steps of clearing said key exchange software from said second processor and clearing said traffic encryption software from said encryption engine after said output data has been transmitted to said telephony network.

21. The method according to claim 19, wherein said identification code input means comprises a keypad and said identification code is a personal identification number (PIN).

22. The method according to claim 19, further comprising the step of converting voice data received at said microphone from analog to digital.

23. The method according to claim 19, wherein said first processor is a smartcard IC.

* * * * *

UNITED STATES PATENT AND TRADEMARK OFFICE
CERTIFICATE OF CORRECTION

PATENT NO. : 6,151,677
DATED : November 21, 2000
INVENTOR(S) : Walter et al.

Page 1 of 1

It is certified that error appears in the above-identified patent and that said Letters Patent is hereby corrected as shown below:

Title page,
Under U.S. Patent Documents, at "4,965,881," after "Dilley," please delete "380/268" and insert -- "380/50 --.

Title page,
Under U.S. Patent Documents, at "5,077,791," after "Salihi," please delete "380/270" and insert -- 380/23 --.

Title page,
Under U.S. Patent Documents, at "5,444,764," after "Galecki," please delete "455/411" and insert -- 379/58 --.

Signed and Sealed this

Twenty-fifth Day of September, 2001

Attest:

NICHOLAS P. GODICI
Attesting Officer *Acting Director of the United States Patent and Trademark Office*